Oct. 14, 1969   H. POPICK ET AL   3,472,998
LASER APPARATUS FOR REMOVING MATERIAL FROM ROTATING OBJECTS
Filed April 3, 1967

INVENTORS
HARVEY POPICK
DONALD LEE ROBERTS
BY Elliott & Pastoriza
ATTORNEYS

United States Patent Office 3,472,998
Patented Oct. 14, 1969

3,472,998
LASER APPARATUS FOR REMOVING MATERIAL FROM ROTATING OBJECTS
Harvey Popick, Canoga Park, and Donald L. Roberts, Thousand Oaks, Calif., assignors, by mesne assignments, to the United States of America as represented by the Administrator of the National Aeronautics and Space Administration
Filed Apr. 3, 1967, Ser. No. 628,094
Int. Cl. B23k 9/04
U.S. Cl. 219—121      1 Claim

ABSTRACT OF THE DISCLOSURE

This disclosure relates to an apparatus for removing material from a rotating object such as a gyroscope wheel to effect dynamic balancing of the wheel. A laser beam is employed to remove the material and to this end the time of firing of the laser is made to correspond to a given position of the rotating object at which position the portion of the object from which material is to be removed intercepts the beam path of the laser. First and second power supply means are provided for the laser, the first charging networks pumping up the laser to a threshold condition in response to a control signal received from transducing means connected to the rotating object. After the laser has reached a threshold condition, a second charging network is automatically connected to the laser to further pump the laser in response to a trigger signal received a delayed time period after the control signal. This delayed period is sufficient to permit the laser to reach a threshold condition. The second charging network is of a shorter time constant and higher voltage so that the laser pulse is narrow thereby providing a fine degree of control over the material removed from the rotating object.

---

The invention described herein was made in the performance of work under a NASA contract and is subject to the provisions of Section 305 of the National Aeronautics and Space Act of 1958, Public Law 85–568 (Stat. 435; 42 U.S.C. 2457).

This invention relates to an apparatus for removing material from rotating objects by means of laser radiation.

Laser radiation has proved to be an ideal means for removing material from objects, particularly objects rotating at high speed. The impingement of a laser pulse itself on a portion of an object rotating at a high speed will actually result in a cutting away or vaporization of a portion of the object and by controlling the intensity and pulse width of the laser radiation striking the object, the amount of material removed may be carefully controlled. Use of a laser for such material removing operations is ideal in balancing gyroscope wheels since dynamic balancing can be carried out while the object is rotating.

Normally, the output radiation from a pulsed laser has a pulse width determined by the pumping characteristic curve which in turn depends on the time constant of the basic charging network for operating the light pump. In this respect, the laser must first be pumped to a threshold condition before lasing begins and by the time the laser has reached this threshold condition, the remaining power from the charging network for pumping follows a fairly shallow curve with the result that the output laser pulse itself is fairly broad. While material may be removed by such a pulsed laser, the scar, particularly on high speed rotating objects, is relatively long because of the pulse width of the radiation and there is thus lacking a certain degree of control over the point of impingement and the amount of material removed from the object.

With the foregoing considerations in mind, it is a primary object of this invention to provide an improved apparatus for removing material from rotating objects wherein a laser system is provided in which an extremely narrow or short pulse of radiation is caused to impinge on the rotating object to the end that a relatively short scar results and a finer degree of control over the impingement point and material removed can be realized.

Briefly, this object is realized by providing first and second charging networks for the laser device itself. The first charging network is caused to pump the laser to a threshold condition in response to a control signal received from suitable transducing means coupled to the rotating object. This control signal occurs at a point in time when the portion of the object from which material is to be removed passes through the beam path of the laser. A trigger signal is then generated a delayed time period after the control signal corresponding to the point in time when the laser has been pumped to its threshold condition. This trigger signal serves to connect the second charging network to the laser so that energy from the second charging network is all pumped into the laser to effect the generation of the laser pulse. In this respect, the second charging network has a very short time constant so that the resulting laser pulse is relatively short with the attendant advantages of a short scar length and thus a finer degree of control over material removal. The apparatus is particularly useful with respect to very high speed rotating objects wherein accuracy in removal of material from portion of the object is extremely important.

A better understanding of the invention will be had by referring to the accompanying drawings, in which.

Figure 1:
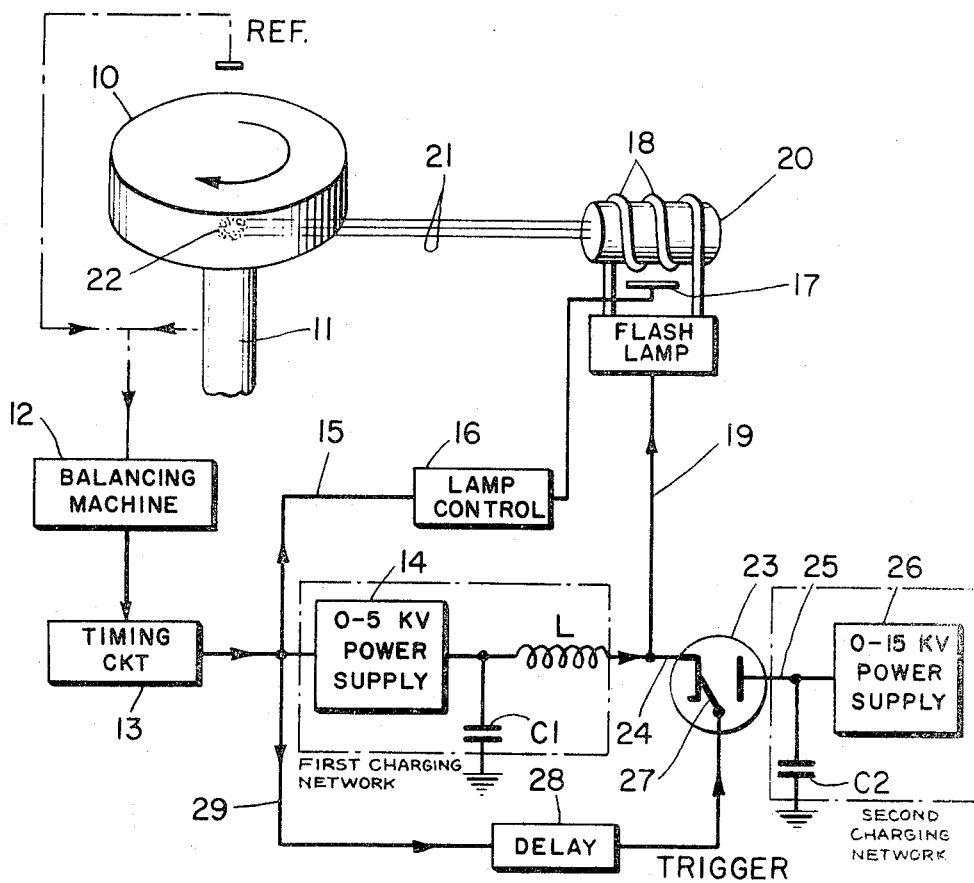
FIGURE 1 is a schematic diagram partly in block form of the invention.

Referring first to FIGURE 1, there is shown an object 10 which may, for example, constitute a gyroscope wheel, mounted for rotation at 11 preparatory to carrying out a dynamic balancing operation.

Cooperating with the rotating object are transducing means including a balancing machine 12 and timing circuit 13. The balancing machine 12 includes suitable transducers for converting unbalance forces into suitable electrical signals, these unbalance forces being generated dynamically unless the rotating wheel 10 is exactly dynamically balanced about its axis of rotation. The particular signals provided by the timing circuit 13 can be synchronized to correspond to the unbalance point of the wheel or portion of the wheel from which material should be removed in order to effect balancing by referencing the signals to a given angular position of the wheel 10 from a fixed reference. A fixed reference signal may be provided from a stationary sensing means labeled REF, as shown. The arrangement is such that a control signal will be provided by the timing circuit 13 whenever an unbalanced portion of the wheel passes through a given point in space.

The laser system for removing material from this portion in order to effect dynamic balancing of the wheel includes a first power supply 14 and cooperating lamp trigger means. This means is connected to receive the control signal from the timing circuit 13 through a lead 15, lamp control 16, and ionization initiator plate 17 disposed adjacent to the helical coils 18 of a flash lamp for the laser.

As shown, the first power supply means 14 is arranged to pump the flash lamp upon discharge of the storage condenser C1 through the inductor L and lead 19. For the particular apparatus illustrated, a five kv. power supply in conjunction with the storage condenser C1 and inductor L, will pump the laser to a threshold condition in approximately three hundred microseconds. As stated, this pumping is initiated by the control signal from the timing circuit 13. The power supply, condenser, and inductor constitute a first charging network.

Firing of the laser rod 20 by means of the first charging network operating by itself will result in a pulse of radiation 21 impinging on the rotating device at a point 22 which corresponds to the point through which a portion of the rotating object from which material is to be removed passes. With only the pumping supplied by 14, the pulse width of the radiation 21 is relatively wide and thus the scar on the rotating object at 22 is relatively long.

In accord with an important feature of this invention, the pulse width of the laser radiation 21 is made considerably shorter by employing a second charging network. Thus as illustrated in FIGURE 1, there is provided a switch means in the form of an ignitron tube 23 having its cathode 24 connected to the lead 19 to the flash lamp and its plate 25 connected to a second power supply shown at 26. The storage condenser C2 with the second power supply constitutes the second charging network and defines a considerably shorter time constant than the first charging network and further the applied voltage is considerably higher. The igniter for the ignitron tube 23 is indicated at 27 and connects to the output of a delay circuit 28 in turn receiving the control signal from the timing circuit 13 through the lead 29.

The control signal received in the delay 28 is the same control signal passed through the lead 15 to initiate lamp operation. The delay 28 provides an output signal which is delayed in time to a point corresponding to the length of time for the laser rod 20 to be pumped to threshold condition. This output signal constitutes a trigger signal for the ignitron tube 23 and when received on the igniter terminal 27, the second power supply 26 will be connected to additionally pump the laser 20 for an intense short period of time thereby providing the desired narrow pulse.

Figure 2:
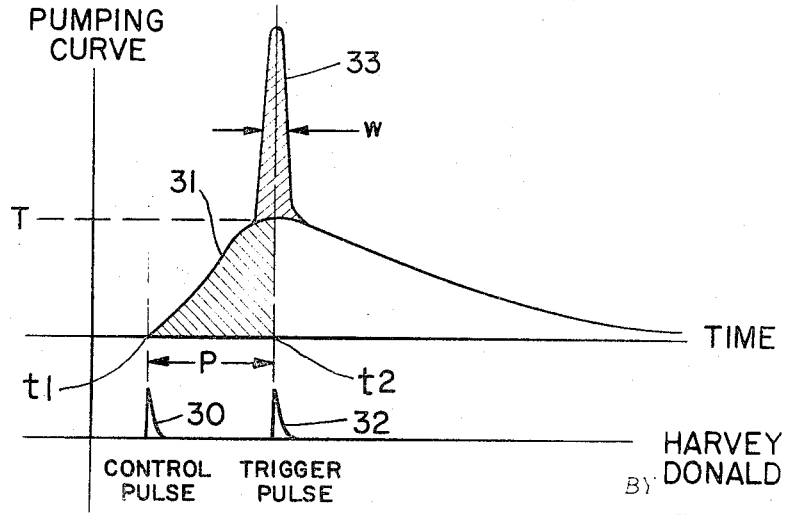
FIGURE 2 illustrates wave forms useful in explaining the operation of the invention of FIGURE 1.

The foregoing operation will be better understood by now referring to FIGURE 2. In the lower wave form of FIGURE 2, there is shown a control pulse 30 which constitutes the control signal from the timing circuit 13. When this signal is passed to the lamp control 16 at the time $t_1$, the spiral flash lamp commences pumping the laser rod 20, the pumping curve being illustrated in the upper wave form at 31. At the time $t_2$, the pumping curve has reached a magnitude T which corresponds to the threshold of operation of the laser. At this time $t_2$, the trigger pulse from the delay 28 indicated at 32 in FIGURE 2 will close the ignitron switch 23 thereby providing additional pumping from the second power supply 26 to the flash lamp. The additional pumping curve is illustrated at 33 and has a considerably narrow width $w$ because of the shorter time constant of the power supply. Thus, with the second power supply provided, the pulse width of the laser pulse of radiation 21 of FIGURE 1 will be considerably narrower resulting in a shorter scar 22 on the rotating object 10.

It will be apparent accordingly that the apparatus enables a finer degree of control to be realized over the amount of material removed as well as a pin-pointing of the exact location on the rotation object from which material is to be removed. In this respect, the timing of the control and trigger pulses is extremely important. For example, period P between $t_1$ and $t_2$ in FIGURE 2 may be of the order of three hundred microseconds. The pulse width $w$ in turn may be of the order of four to forty microseconds. The period P corresponds to the time to pump the laser rod to a threshold condition and thus in the embodiment illustrated in FIGURE 1, the delay circuit 28 will be set to provide a trigger pulse at exactly this time period after the control pulse is received. The directing of the laser rod 20 can be adjusted to take into account the r.p.m. of the rotating object such as to precisely have its beam impinge on the desired unbalance point of the rotating object from which material is to be removed. This particular point will be directly in the path of the beam at the time $t_2$ when the trigger pulse 32 closes the ignitron tube switch 23 to provide the additional pumping for the laser rod thereby effecting laser operation.

In the circuit of FIGURE 1, the trigger pulse is derived from the control pulse by means of the delay 28. It will be understood of course, that a lamp current sensing coil could be employed to provide the trigger pulse 32 only when the lamp current corresponded to that resulting when a threshold condition of the laser rod 20 is attained.

From the foregoing description, it will be evident that the present invention has provided an improved laser apparatus for removing material from rotating objects wherein the desired ends of accuracy and finer control of material removal are realized.

What is claimed is:

1. An apparatus for removing material from a rotating object, comprising, in combination: a laser medium positioned to direct its beam when fired at a given point in space through which a portion of said object from which material is to be removed passes when said object is rotating; transducer means responsive to rotation of said object for providing a control signal when said portion passes said point; a flash lamp optically coupled to said laser medium; a first charging network connected to said flash lamp for pumping said laser medium with light energy from said flash lamp to a threshold condition in response to said control signal; means for generating a trigger signal at a point in time when said laser medium reaches said threshold condition; a second charging network connected to said flash lamp for providing pumping energy of higher voltage and shorter time constant than said first charging network; normally open switch means connected between said second charging network and said flash lamp and responsive to said trigger signal to close such that said laser medium is additionally pumped by light from said flash lamp generated by power from said second charging network to provide laser radiation of narrower pulse width than would occur in the absence of said second charging network to result in a shorter scar length of material removed from said portion and thereby provide a finer degree of control of the material removed; said means for generating a trigger signal including delay means receiving said control signal and designed to provide an output signal a given time delay after said control signal corresponding to the time to attain said threshold condition, said output signal defining said trigger signal.

References Cited

UNITED STATES PATENTS

| 3,172,056 | 3/1965 | Stitch | 331—94.5 |
| 3,178,657 | 4/1965 | Morse | 331—94.5 |
| 3,259,730 | 7/1966 | Wehde et al. | |
| 3,199,049 | 8/1965 | Morse et al. | 331—94.5 |

JOSEPH V. TRUHE, Primary Examiner

W. DEXTER BROOKS, Assistant Examiner

U.S. Cl. X.R.

219—69